United States Patent
Harada

(10) Patent No.: US 9,749,487 B2
(45) Date of Patent: Aug. 29, 2017

(54) DOCUMENT READING DEVICE THAT DETECTS ORIENTATION OF IMAGE READ FROM SPREAD DOCUMENT

(71) Applicant: KYOCERA Document Solutions Inc., Osaka (JP)

(72) Inventor: Hiroyuki Harada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/080,999

(22) Filed: Mar. 25, 2016

(65) Prior Publication Data

US 2016/0286065 A1 Sep. 29, 2016

(30) Foreign Application Priority Data

Mar. 27, 2015 (JP) ................................. 2015-066504

(51) Int. Cl.
H04N 1/00 (2006.01)
H04N 1/21 (2006.01)

(52) U.S. Cl.
CPC ....... *H04N 1/00809* (2013.01); *H04N 1/0044* (2013.01); *H04N 1/00721* (2013.01); *H04N 1/00726* (2013.01); *H04N 1/00771* (2013.01); *H04N 1/00795* (2013.01); *H04N 1/00803* (2013.01); *H04N 1/2108* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,406,570 B2 | 3/2013 | Morimoto et al. | |
| 2005/0238205 A1* | 10/2005 | Kimura | G06K 9/03 |
| | | | 382/112 |
| 2010/0053696 A1* | 3/2010 | Sasano | H04N 1/40 |
| | | | 358/449 |
| 2010/0103481 A1 | 4/2010 | Morimoto et al. | |
| 2012/0105918 A1* | 5/2012 | Fan | G06K 9/3208 |
| | | | 358/462 |
| 2015/0116783 A1* | 4/2015 | Numata | H04N 1/00411 |
| | | | 358/3.27 |

FOREIGN PATENT DOCUMENTS

JP 2010-109559 A 5/2010

* cited by examiner

*Primary Examiner* — Mohammad Ghayour
*Assistant Examiner* — Lennin Rodriguezgonzale
(74) *Attorney, Agent, or Firm* — Studebaker & Brackett PC

(57) ABSTRACT

A document reading device includes a reading section, an orientation detecting section, an orientation determining section, and a notification section. The reading section reads images of respective pages of a spread document one at a time. The orientation detecting section sequentially detects orientations of respective images read by the reading section. The orientation determining section determines whether or not the orientation detecting section detects orientation alternation between a first orientation and a second orientation opposite to the first orientation for a read image read by the reading section. The notification section notifies an error upon the orientation determining section determining that the orientation detecting section does not detect orientation alternation between the first orientation and the second orientation.

8 Claims, 6 Drawing Sheets

DOCUMENT READING DEVICE THAT DETECTS ORIENTATION OF IMAGE READ FROM SPREAD DOCUMENT

INCORPORATION BY REFERENCE

The present application claims priority under 35 U.S.C. §119 to Japanese Patent Application No. 2015-066504, filed on Mar. 27, 2015. The contents of this application are incorporated herein by reference in their entirety.

BACKGROUND

The present disclosure relates to document reading devices and document reading methods.

Document reading devices such as scanners read an image of an original document placed on a document table. In order that respective pages of a spread document are read, a user turns pages of the spread document one at a time and places the spread document with a reading target page opened on the document table.

Incidentally, some document reading device includes a document table having a size smaller than the size of a spread document. In order that respective pages of such a spread document is read using the document reading device, a user turns the pages and places one of text blocks of the spread document on the document table one at a time. However, when the user repeats page turning and placement of one of the text blocks of the spread document on the document table plural times, the user may place a wrong text block of the spread document open to a wrong page on the document table. As a result, images of the original document may be read in an unintentional order. Alternatively, a situation may occur in which an image of a page is read twice or not read. In view of the foregoing, various techniques for solution to the above problems have been proposed.

For example, a certain image forming apparatus displays on a display device a preview image that indicating an image read by a document reading device. Specifically, the image forming apparatus displays on the display device a preview image each time an image of an original document is read.

SUMMARY

A document reading device according to the present disclosure includes a reading section, an orientation detecting section, an orientation determining section, and a notification section. The reading section reads images of respective pages of a spread document one at a time. The orientation detecting section sequentially detects orientations of respective images read by the reading section. The orientation determining section determines whether or not the orientation detecting section detects orientation alternation between a first orientation and a second orientation opposite to the first orientation for a read image read by the reading section. The notification section notifies an error upon the orientation determining section determining that the orientation detecting section does not detect orientation alternation between the first orientation and the second orientation.

A document reading method according to the present disclosure is a method for sequentially reading images of respective pages of a spread document and includes the followings: reading images of respective pages of the spread document; detecting an orientation of a currently read image; determining whether or not an orientation of the currently read image read is opposite to an orientation of a previously read image; and notifying an error upon determination that the orientation of the currently read image is not opposite to the orientation of the previously read image.

DETAILED DESCRIPTION

Figure 1A:
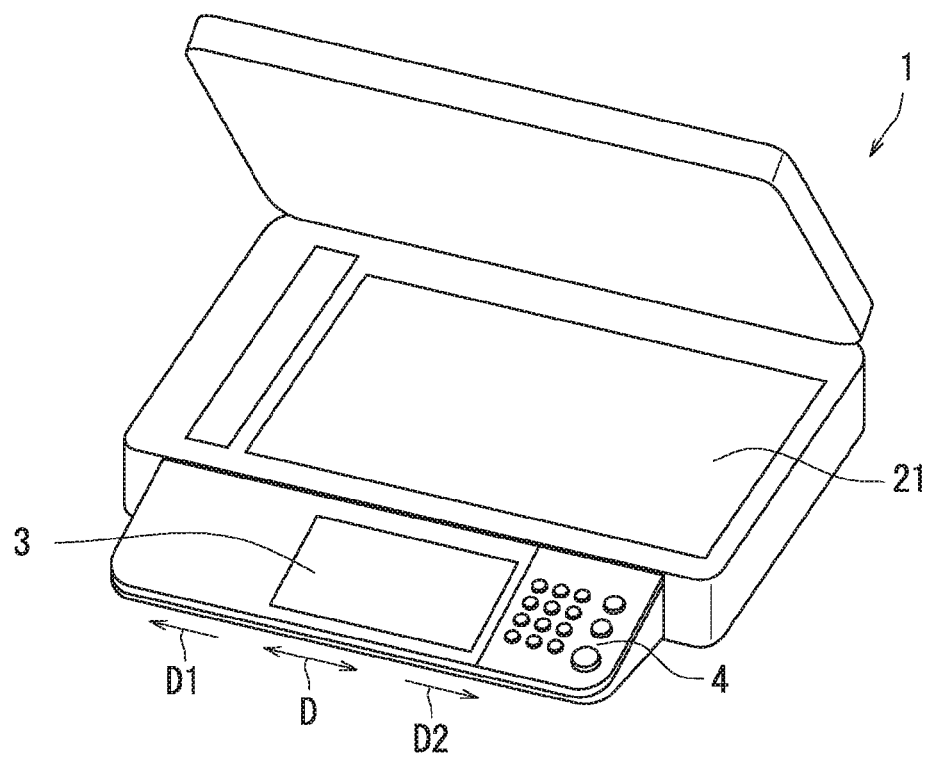
FIG. 1A is a perspective view illustrating an outer appearance of a document reading device according to an embodiment of the present disclosure.

Description will be made below about a document reading device and a document reading method according to an embodiment of the present disclosure with reference to the accompanying drawings. In the drawings, like reference signs represent like or corresponding components and description thereof is not repeated.

Figure 1B:
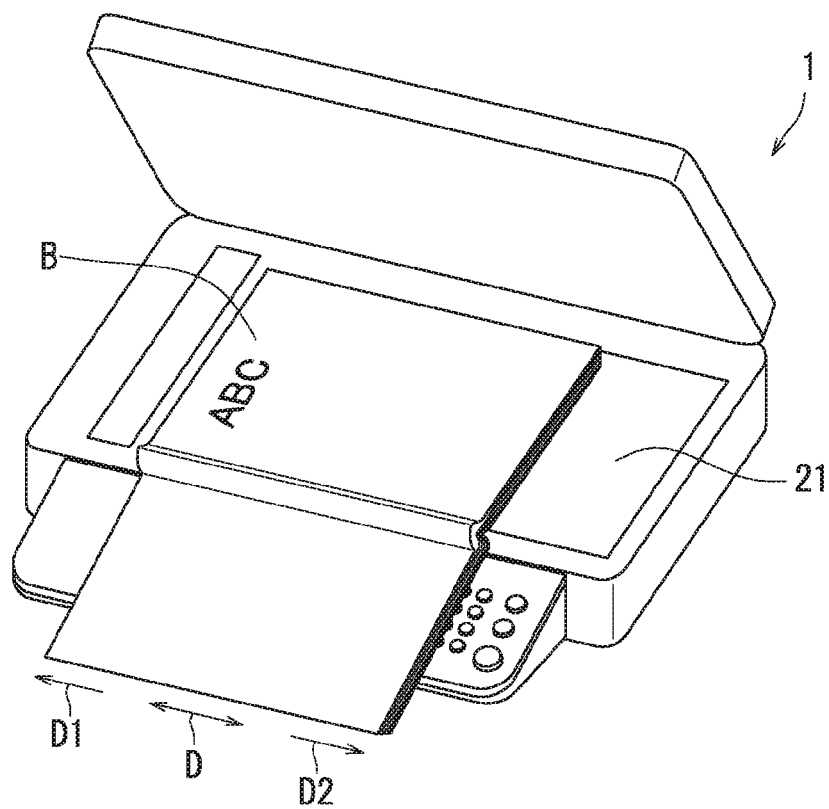
FIG. 1B is a perspective view illustrating a state in which a text block of a spread document is placed on a document table illustrated in FIG. 1A.

With reference to FIGS. 1A and 1B, a configuration of a document reading device 1 will be described first. In the present embodiment, the document reading device 1 is a document reading device with which a copier, a multifunction peripheral, a scanner, or the like is provided. FIG. 1A is a perspective view illustrating an outer appearance of the document reading device 1. FIG. 1B is a perspective view illustrating a state in which one of text blocks of a spread document B is placed on a document table 21 of the document reading device 1. As illustrated in FIG. 1A, the document reading device 1 includes an input section 4 and a display section 3 that is an example of a notification section, in addition to the document table 21. The display section 3 displays various types of information. In the present embodiment, the display section 3 notifies an error. The display section 3 may be a liquid crystal display, for example. The input section 4 receives a user input operation. The input section 4 may be an operation panel, for example.

As illustrated in FIG. 1B, a user opens the spread document B and places one of text blocks of the spread document B in an open state on the document table 21. The document reading device 1 reads images of respective pages of the text block of the spread document B placed on the document table 21 one at a time.

A configuration of the document reading device 1 will be described next with reference to FIG. 2.

Figure 2:
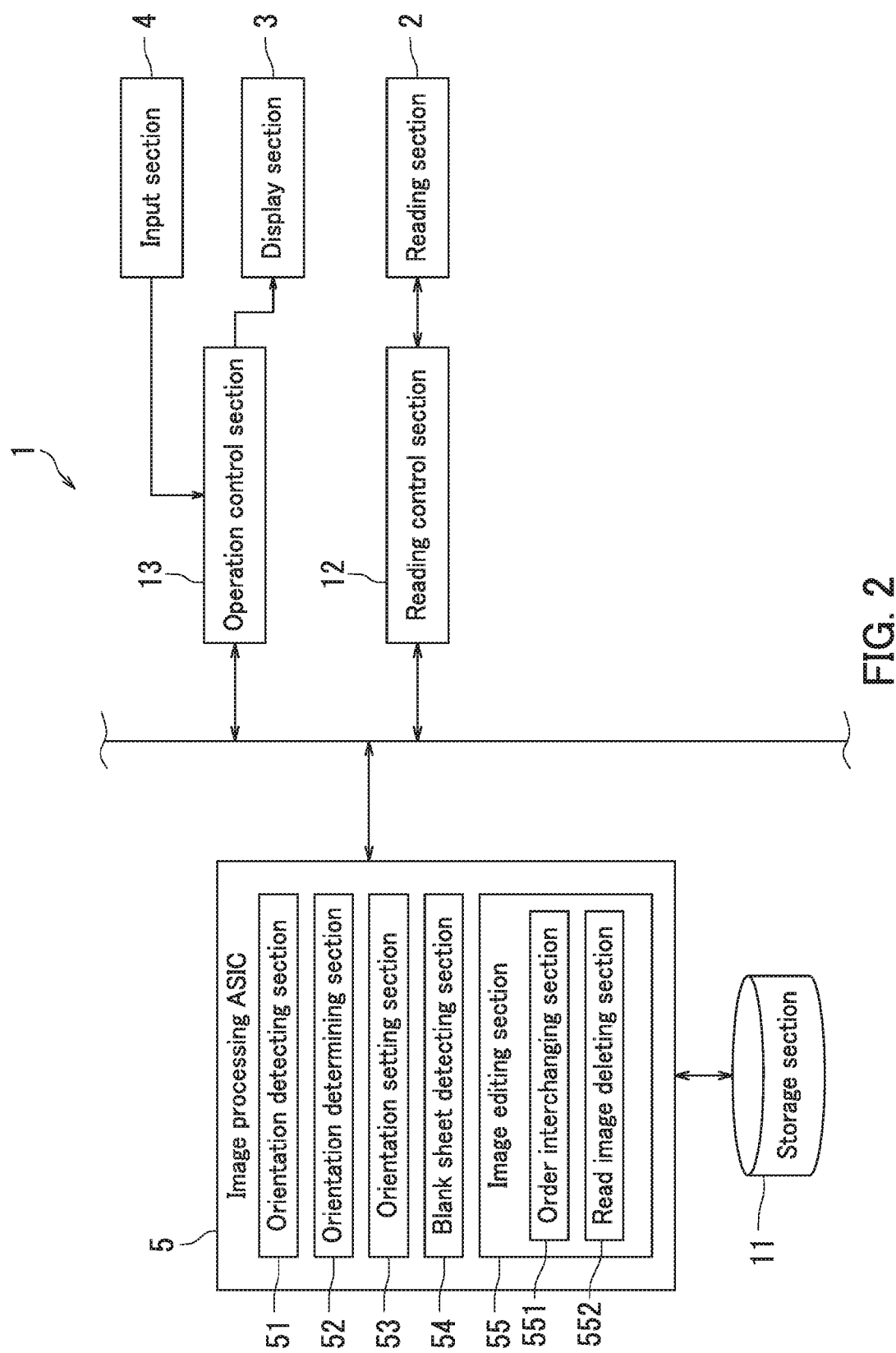
FIG. 2 is a block diagram of a configuration of the document reading device according to the embodiment of the present disclosure.

As illustrated in FIG. 2, the document reading device 1 additionally includes a reading section 2, an image processing application specific integrated circuit (ASIC) 5, a storage section 11, a reading control section 12, and an operation control section 13.

The reading section 2 reads images of the respective pages of the spread document B one at a time. Hereinafter, an image read by the reading section 2 will be referred to as a read image. Once reading an image, the reading section 2 transmits a signal corresponding to the read image to the reading control section 12. The reading section 2 may be a line sensor, for example.

The input section 4 transmits a signal corresponding to a user input operation to the operation control section 13.

The reading control section 12 controls operation of the reading section 2. The reading control section 12 generates image data of the read image based on the signal transmitted from the reading section 2. The image data of the read image generated by the reading control section 12 is transmitted to the image processing ASIC 5.

The operation control section 13 causes the display section 3 to display a result of processing by the image processing ASIC 5. Also, the operation control section 13 generates input data based on the signal transmitted from the input section 4. The operation control section 13 transmits the input data to the image processing ASIC 5.

The storage section 11 includes a hard disk drive (HDD). The storage section 11 stores the image data of the read image and data indicating an attribute of the read image. In the present embodiment, the storage section 11 stores as data indicating an attribute of a read image, data indicating an orientation of the read image and data indicating an order of the read data in a sequence of read images read by the reading section 2. The orientation of a read image is indicated as either a first orientation or a second orientation. Data indicating an attribute of a read image includes for example data indicating which orientation the read image has, a landscape orientation or a portrait orientation.

The image processing ASIC 5 receives the input data transmitted from the operation control section 13. The image processing ASIC 5 transmits a result of processing to the operation control section 13. The image processing ASIC 5 causes the storage section 11 to store the image data of the read image transmitted from the reading control section 12.

The image processing ASIC 5 reads out the image data of the read image stored in the storage section 11 and executes various types of processing on the read image data of the read image. The image processing ASIC 5 causes the storage section. 11 to store the processed image data of the read image. In the following description, a description is omitted about reading-out of image data of a read image from the storage section 11 and storage of the processed image data that are accompanied by execution of various processing by the image processing ASIC 5. Execution of processing on image data of a read image by the image processing ASIC 5 may be referred simply to execution of processing on a read image by the image processing ASIC.

The image processing ASIC 5 includes an orientation detecting section 51, an orientation determining section 52, an orientation setting section 53, a blank sheet detecting section 54, and an image editing section 55.

The orientation detecting section 51 detects an orientation of a currently read image read by the reading section 2. Hereinafter, a read image currently read by the reading section 2 will be referred to as a currently read image. The orientation detecting section 51 detects an orientation of a read image based on a technique of optical character recognition (OCR). The image processing ASIC 5 causes the storage section 11 to store the orientation of the read image detected by the orientation detecting section 51.

The orientation determining section 52 determines whether or not the orientation detecting section 51 detects orientation alternation between a first orientation and a second orientation opposite to the first direction for the currently read image. Specifically, when the orientation detecting section 51 detects the first orientation as the orientation of the currently read image, the orientation determining section 52 determines whether or not the orientation of an image previously read by the reading section 2 among read images stored in the storage section 11 is the second orientation. Hereinafter, an image previously read by the reading section 2 will be referred to as a previously read image. The second orientation is an orientation rotated by 180 degrees from the first orientation. By contrast, when the orientation detecting section 51 detects the second orientation as the orientation of the currently read image, the orientation determining section 52 determines whether or not the orientation of the previously read image is the first orientation. That is, the orientation determining section 52 determines whether or not the orientation of the currently read image matches the orientation of the previously read image. Upon the orientation determining section 52 determining that the orientation of the currently read image matches with that of the previously read image, the image processing ASIC 5 notifies a user of an error. Specifically, the image processing ASIC 5 causes, through the operation control section 13, the display section 3 to display information indicating that the orientation of the currently read image matches with that of the previously read image.

In a situation in which the orientation determining section 52 cannot determine the orientation of the currently read image, that is, the orientation detecting section 51 fails to detect the orientation of the currently read image, the orientation setting section 53 sets an orientation for the currently read image. The image processing ASIC 5 causes the storage section 11 to store the orientation of the currently read image set by the orientation setting section 53.

Specifically, in a situation in which the orientation determining section 52 cannot determine the orientation of the currently read image, that is, the orientation detecting section 51 fails to detect the orientation of the currently read image, the orientation setting section 53 determines whether or not the storage section 11 stores the orientation of the previously read image. When determining that the storage section 11 does not store the orientation of the previously read image, the orientation setting section 53 sets a preset orientation for the currently read image. Specifically, when an orientation of a read image of the first page of the spread document B is not detected, the orientation setting section 53 sets the preset orientation as the orientation of the read image of the first page of the spread document B.

By contrast, when it is determined that the storage section 11 stores the orientation of the previously read image, the orientation setting section 53 sets an orientation for the currently read image based on the orientation of the previously read image. That is, in a situation in which the orientation detecting section 51 fails to detect an orientation of a read image of any of the second and subsequent pages of the spread document B, the orientation setting section 53 sets an orientation for the currently read image based on the orientation of the previously read image. Specifically, the orientation setting section 53 sets for the currently read image an orientation opposite to the orientation of the previously read image (orientation rotated by 180 degrees).

In a specific example situation in which the previously read image has the first orientation, the orientation setting section 53 sets the second orientation for the currently read image.

The blank sheet detecting section 54 detects whether or not a read image is an image of a blank sheet. In the present embodiment, the blank sheet detecting section 54 detects whether or not a read image is an image of a blank sheet based on a brightness of the read image.

The image editing section 55 edits read images in response to a user input operation through the input section 4. The image editing section 55 includes an order interchanging section 551 and a read image deleting section 552.

Once the input section 4 receives a user input operation for order interchange between the currently read image and the previously read image, the order interchanging section 551 interchanges the order of the currently read image with the order of the previously read image. Specifically, the order interchanging section 551 determines whether or not an interchange flag is raised. Upon determining that the interchange flag is raised, the order interchanging section 551 interchanges the order of the currently read image with the order of the previously read image. Once the input section 4 receives a user input operation for order interchange between the currently read image and the previously read image, the lowered interchange flag is raised. Upon completion of order interchange between the currently read image and the previously read image, the raised interchange flag is lowered.

When the input section 4 receives a user input operation to delete a read image, the read image deleting section 552 deletes the image data of the currently read image and the data indicating the attribute of the currently read image from the storage section 11. Alternatively, the read image deleting section 552 deletes the image data of the previously read image and the data indicating the attribute of the previously read image in addition to the image data of the currently read image and the data indicating the attribute of the currently read image.

Figure 3A:
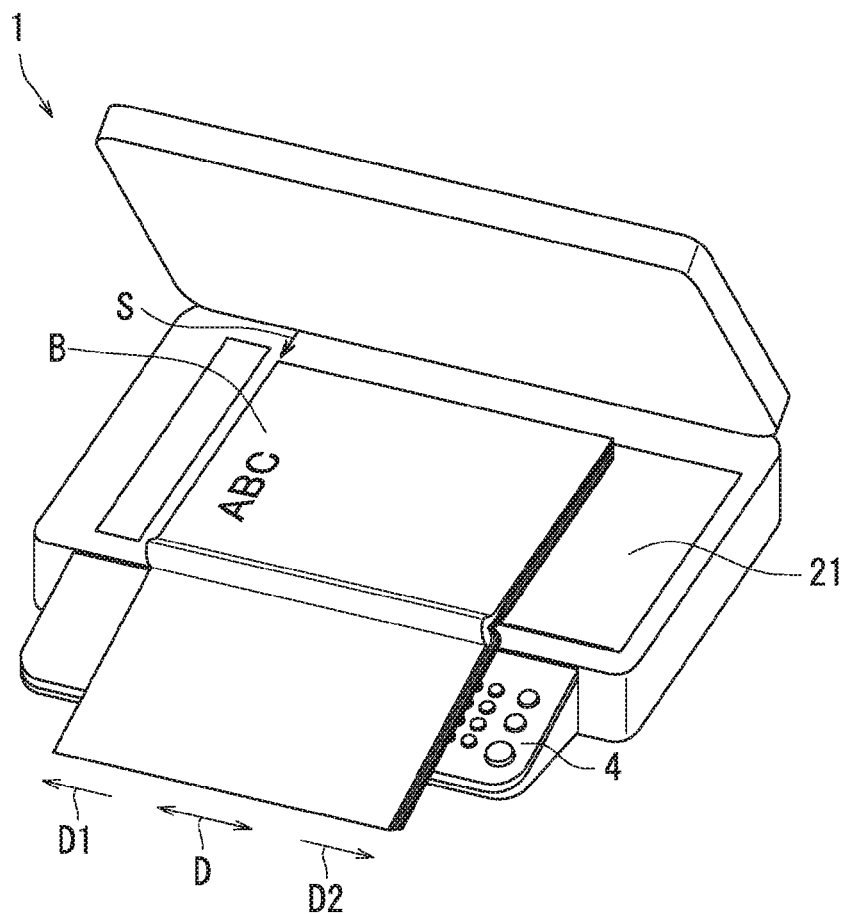
FIG. 3A is a diagram illustrating a state in which one of text blocks of a spread document is placed on the document table in FIG. 1 so as to have a first orientation.
Figure 3B:
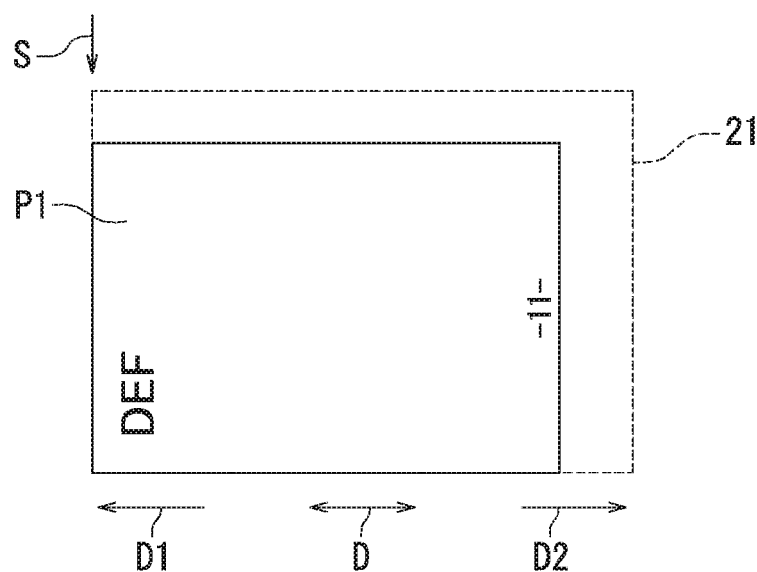
FIG. 3B is a diagram illustrating a read image read from the spread document in FIG. 3A.
Figure 4A:
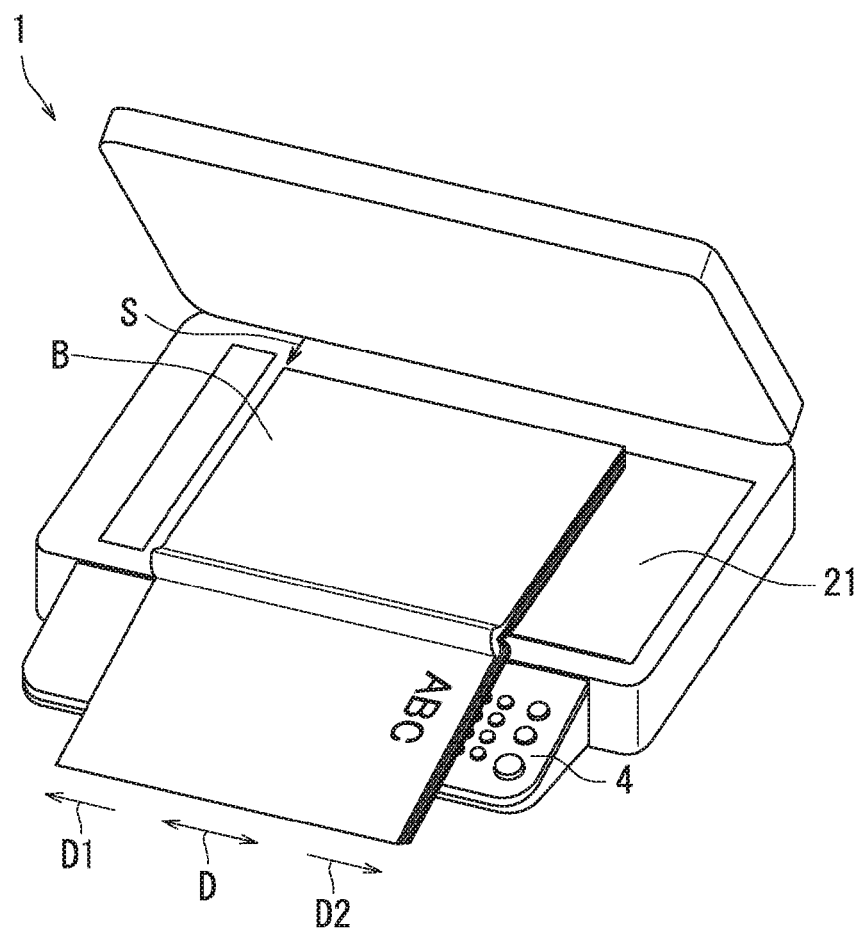
FIG. 4A is a diagram illustrating a state in which the other text block of the spread document is placed on the document table in FIG. 1 so as to have a second orientation.
Figure 4B:
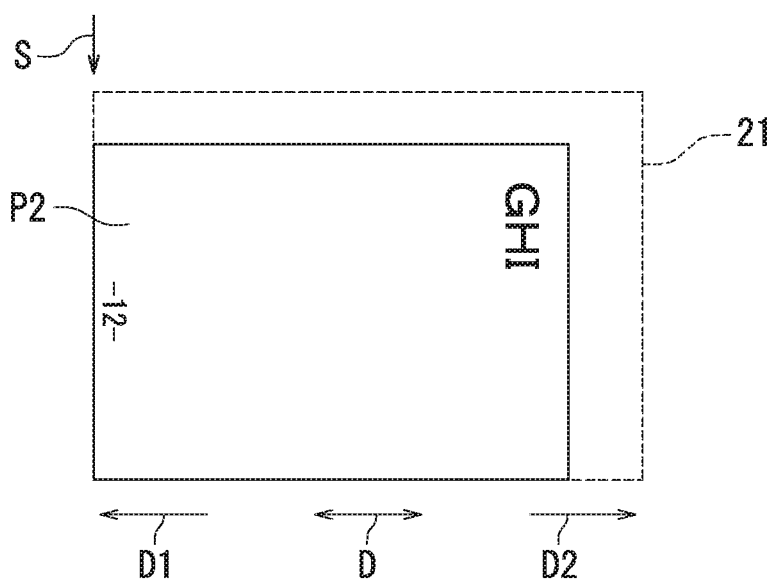
FIG. 4B is a diagram illustrating a read image read from the spread document in FIG. 4A.

With reference to FIGS. 3A-4B, description will be made next about an orientation of a read image in a situation in which one of text blocks of a spread document B bound in Western style is placed on the document table 21. FIG. 3A illustrates a state in which one of the text blocks of the spread document B bound in Western style is placed on the document table 21 so as to have the first orientation. FIG. 3B illustrates a read image P1 of a page of the text block of the spread document B placed so as to have the first orientation. FIG. 4A illustrates a state in which the other text block of the spread document B is placed on the document table 21 so as to have the second orientation. FIG. 4B illustrates a read image P2 of a page of the text block of the spread document B placed so as to have the second orientation. Note that the document table 21 is indicated by respective broken lines in FIGS. 3B and 4B for facilitating understanding.

A user places a left text block of the spread document B on the document table 21, as illustrated in FIG. 3A. Specifically, the user places the spread document B so that the upper edge of the left text block of the spread document B agrees with a reading start point S in a sub-scanning direction D. When the reading section 2 reads an image in this state, a read image P1 has the first orientation D1, as illustrated in FIG. 3B.

Subsequently, the user rotates the spread document B by 180 degrees and places the spread document B on the document table 21 so that a right text block is located on the document table 21, as illustrated in FIG. 4A. Specifically, the user places the spread document B so that the lower edge of the right text block of the spread document B agrees with the reading start point S. When the reading section 2 reads an image in this state, a read image P2 has the second orientation D2, as illustrated in FIG. 4B.

The user repeats plural times the operation illustrated in FIGS. 3A through to 4B while turning pages of the spread document B.

With reference to FIGS. 1-6, operation of the document reading device 1 (a document reading method) will be described next. At an operation start of the document reading device 1, the interchange flag is lowered.

Figure 5:
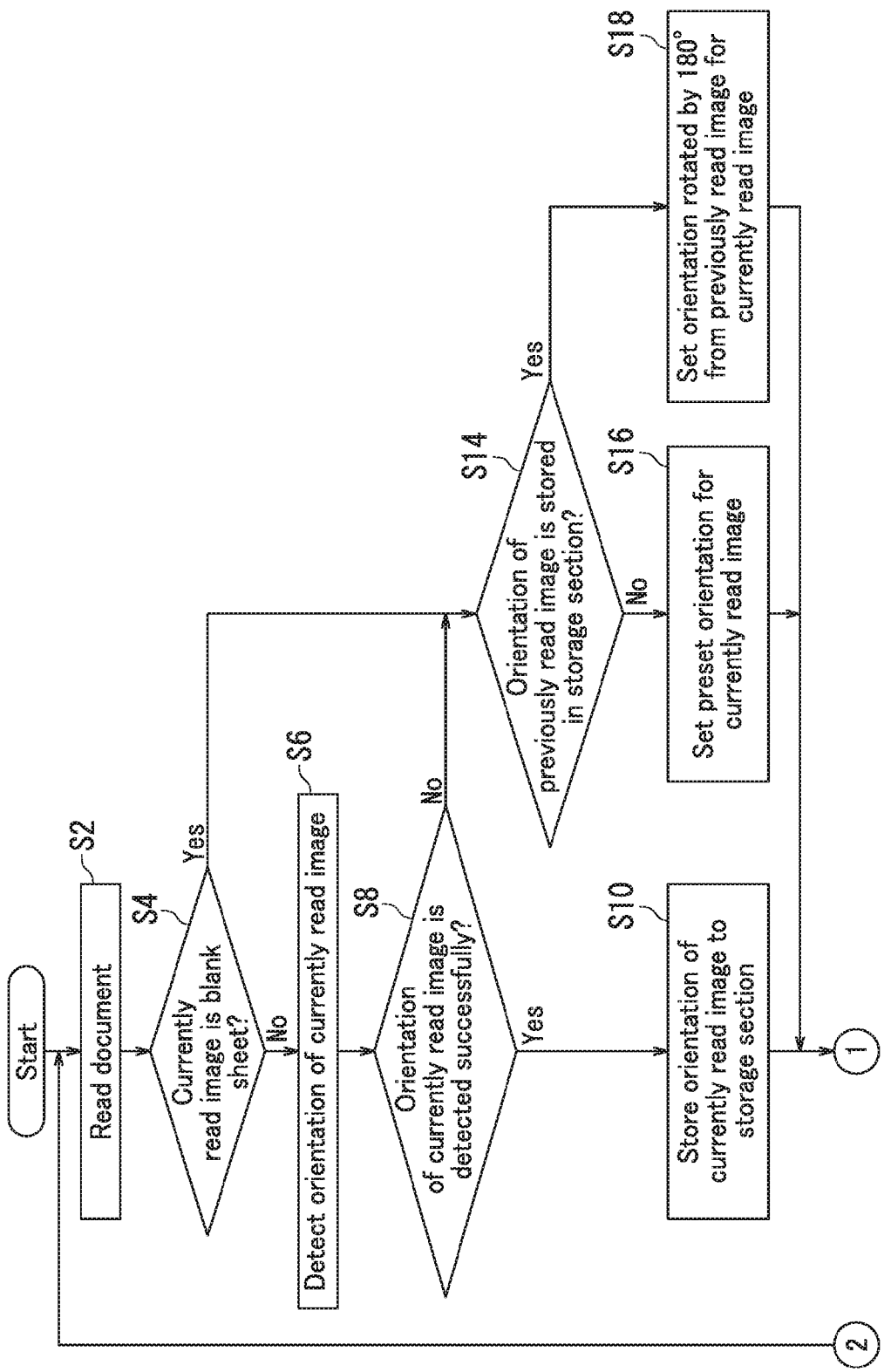
FIG. 5 is a flowchart depicting a former half of operation of the document reading device according to the embodiment of the present disclosure.

Once a user places a spread document B on the document table 21 and inputs a read instruction to the input section 4, the reading section 2 reads an image of the spread document as depicted in FIG. 5 (Step S2). The blank sheet detecting section 54 detects whether or not the currently read image read by the reading section 2 is an image of a blank sheet. Specifically, the blank sheet detecting section 54 detects whether or not the currently read image is an image of a blank sheet based on the brightness of the read image (Step S4). Upon the blank sheet detecting section 54 detecting that the currently read image is an image of a blank sheet (Yes at Step S4), the processing proceeds to Step S14. By contrast, upon the blank sheet detecting section 54 detecting that the currently read image is not an image of a blank sheet (No at Step S4), the orientation detecting section 51 detects an orientation of the currently read image. Specifically, the orientation detecting section 51 detects the orientation of the currently read image using the OCR function (Step S6).

Figure 6:
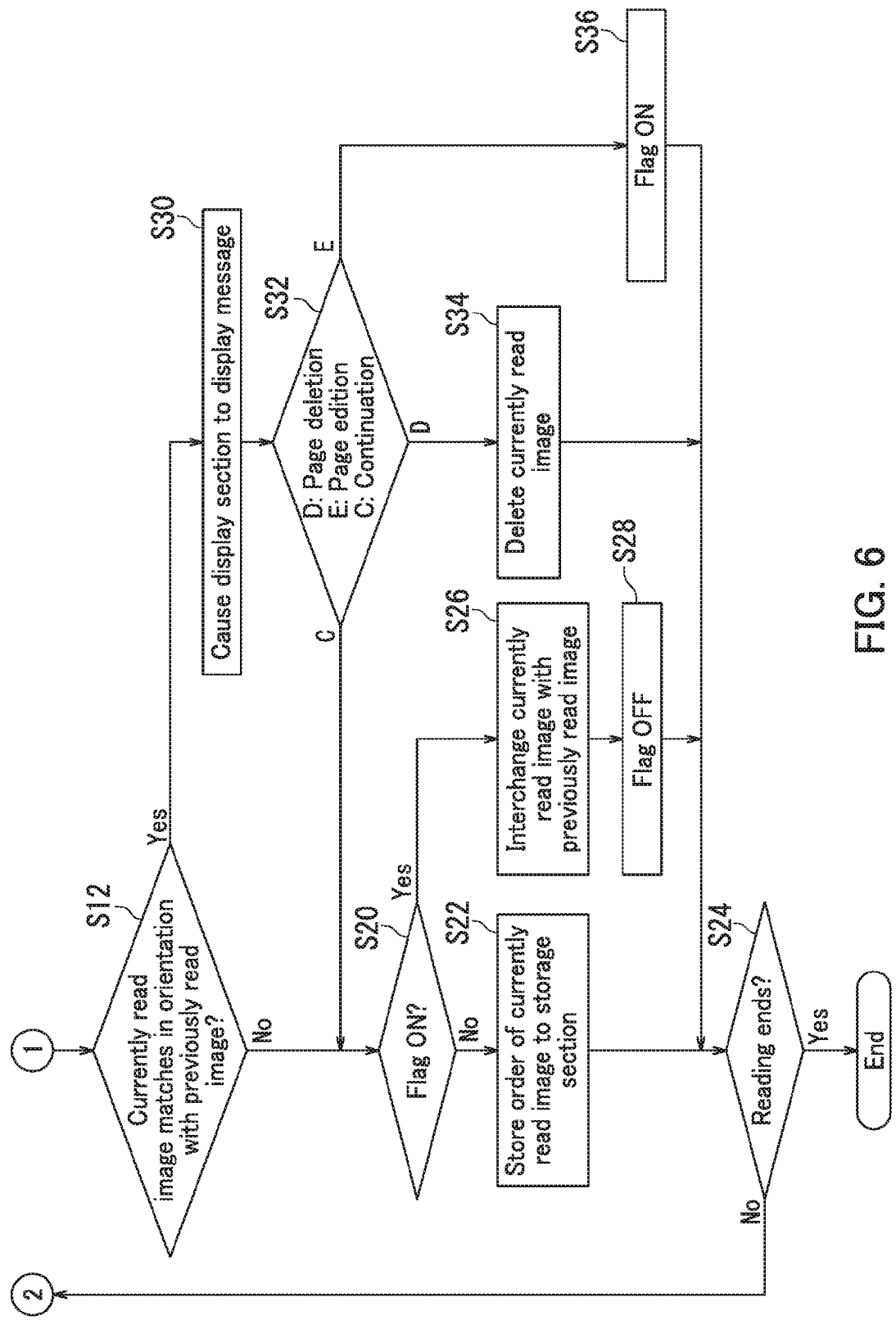
FIG. 6 is a flowchart depicting the latter half of the operation of the document reading device according to the embodiment of the present disclosure.

Upon the orientation detecting section 51 successfully detecting the orientation of the currently read image (Yes at S8), the image processing ASIC 5 causes the storage section 11 to store the orientation of the currently read image (Step S10). Then, the processing proceeds to Step S12, as depicted in FIG. 6. By contrast, upon the orientation detecting section 51 failing to detect the orientation of the currently read image (No at S8), the processing proceeds to Step S14.

Upon the blank sheet detecting section 54 detecting that the currently read image is an image of a blank sheet (Yes at Step S4) and upon the orientation detecting section 51 failing detection of the orientation of the currently read image (No at S8), the orientation setting section 53 determines whether or not the storage section 11 stores the orientation of the previously read image (Step S14).

Upon determination that the storage section 11 does not store the orientation of the previously read image (No at Step S14), the orientation setting section 53 sets a preset orientation for the currently read image (Step S16). Then, the processing proceeds to Step S12. By contrast, upon determination that the storage section 11 stores the orientation of the previously read image (Yes at Step S14), the orientation setting section 53 sets for the currently read image, an orientation obtained by rotating the orientation of the previously read image by 180 degrees (Step S18). Then, the processing proceeds to Step S12.

As depicted in FIG. 6, the orientation determining section 52 determines whether or not the orientation of the currently read image matches with the orientation of the previously read image (Step S12). Upon the orientation determining section 52 determining that the orientation of the currently read image does not match with the orientation of the previously read image (No at Step S12), the image editing section 55 determines whether or not the interchange flag is raised (Step S20). Upon the image editing section 55 determining that the interchange flag is lowered (No at Step S20), the image processing ASIC 5 causes the storage section 11 to store an order number of the currently read image (Step S22). Then, the processing proceeds to Step S24.

By contrast, upon the image editing section 55 determining that the interchange flag is raised (Yes at Step S20), the order interchanging section 551 interchanges the order of the currently read image with the order of the previously read image (Step S26). Subsequently, the image processing ASIC 5 lowers the interchange flag (Step S28). Then, the processing proceeds to Step S24.

When the user inputs an instruction to terminate reading to the input section 4 within a predetermined time period (Yes at Step S24), the processing ends. By contrast, when the user inputs a read instruction to the input section 4 within the predetermined time period (No at Step S24), the processing returns to Step S2. Unless the user inputs a read instruction to the input section 4 within the predetermined time period, the processing ends. The processing may end when the user inputs a cancel instruction to the input section 4 within the predetermined time period.

Upon the orientation determining section 52 determining that the orientation of the currently read image matches with the orientation of the previously read image (Yes at Step S12), the image processing ASIC 5 causes display of a predetermined message (Step S30). Specifically, the image processing ASIC 5 causes the display section 3 to display a massage indicating that the orientation of the currently read image matches with the orientation of the previously read image. Further, the image processing ASIC 5 causes the display section 3 to additionally display messages of "page deletion", "page edition", and "continuation". When a user input operation is received thereafter, the image editing section 55 determines which is the user input operation, "page deletion", "page edition", or "continuation" (Step S32).

When the image editing section 55 determines that the user input operation is "continuation" (C at Step S32), the processing proceeds to Step S20.

Alternatively, when the image editing section 55 determines that the input operation is "page edition" (E at Step S32), the image processing ASIC 5 raises the interchange flag (Step S36). Then, the processing proceeds to Step S24.

Alternatively, when the image editing section 55 determines that the user input operation is "page deletion" (D at Step S32), the read image deleting section 552 deletes image data of the currently read image and data indicating an attribute of the currently read image from the storage section 11 (Step S34). Then, the processing proceeds to Step S24. The image editing section 55 may delete image data of the previously read image and data indicating an attribute of the previously read image in addition to the image data of the currently read image and data indicating the attribute of the currently read image.

The orientation determining section 52 determines whether or not the orientation of the currently read image matches with the orientation of the previously read image at Step S12. Alternatively, the image processing ASIC may determine whether or not the orientation of the currently read image matches with the orientation of the previously read image. Specifically, the image processing ASIC 5 determines through pattern matching whether or not the orientation of the currently read image matches with the orientation of the previously read image.

The document reading device 1 according to the present embodiment has been described so far. According to the present embodiment, the document reading device 1 can cause the display section 3 to display a massage indicating that the orientation of the currently read image matches with the orientation of the previously read image in a situation in which the orientation of the currently read image matches with the orientation of the previously read image. Through the above, a user can perceive that a wrong text block of a spread document is placed on the document table 21. That is, this can eliminate the need for a user to check the display section 3 each time of reading is performed. It is only required for the user to check the display section 3 when a message is displayed on the display section 3. As a result, efficient reading of the spread document B can be achieved.

Further, in the present embodiment, in a situation in which a user places a wrong text block of a spread document on the document table 21, the order of the currently read image can be interchanged with the order of the previously read image. In the above configuration, when the order of read images is interchanged in a situation in which a wrong text block is placed on the document table 21, read images can be arranged in desired order. Furthermore, according to the present embodiment, the currently read image and/or previously read image can be deleted. As a result, even in a situation in which the same page is read twice, a read image of an unnecessary page can be deleted. Through the above, efficient reading of the spread document B can be achieved.

According to the present embodiment, the blank sheet detecting section 54 can detect whether or not a read image is an image of a blank sheet. The above configuration can eliminate the need for the orientation detecting section 51 to detect an orientation of an image of a blank page. As a result, a time period necessary for orientation detection of a read image by the orientation detecting section 51 can be shortened. Thus, efficient reading of the spread document B can be achieved.

In a situation in which the orientation of the currently read image matches with the orientation of the previously read image stored in the storage section 11, the document reading device 1 in the present embodiment causes the display section 3 to display a message indicating that the orientation of the currently read image matches with the orientation of the previously read image, which however should not be taken to limit the present disclosure. For example, the document reading device 1 may calculate the orientation of the currently read image based on the orientation of the first page of a spread document and the order number of the currently read image. In the above configuration, the document reading device 1 causes the display section 3 to display an error message when the currently read image obtained through the calculation does not match with the orientation of the currently read image detected by the orientation detecting section 51.

The embodiment of the present disclosure has been described so far with reference to the drawings (FIGS. 1-6). However, the present disclosure is not limited to the above embodiment and can be practiced in various ways within the scope not departing from the essence of the present disclosure.

What is claimed is:
1. A document reading device comprising:
a document table that has a smaller size than a spread document and on which the spread document is placed in an open state on a page-by-page basis;
a document table cover openable and closable relative to the document table;
a reading section configured to read images of respective pages of the spread document one at a time on the page-by-page basis each time the spread document is placed in the open state on the document table;

a storage device configured to store therein read images read by the reading section;

a processor configured to sequentially detect whether or not orientations of the read images each are a first direction or a second direction opposite to the first direction, store the detected orientations of the read images to the storage device, and determine whether or not an orientation of a currently read image read by the reading section matches with an orientation of a previously read image read by the reading section among the orientations of the read images stored in the storage device;

a notification section configured to notify an error upon the processor determining that the orientation of the currently read image matches with that of the previously read image; and an input device that receives an input operation by a user, wherein when the orientation of the currently read image is the first direction, the processor determines whether or not the orientation of the currently read image matches with that of the previously read image through determination as to whether or not the orientation of the currently read image is the second direction, when the orientation of the currently read image is the second direction, the processor determines whether or not the orientation of the currently read image matches with that of the previously read image through determination as to whether or not the orientation of the currently read image is the first direction, the storage device further stores orders of the read images read by the reading section in a sequence of the read images, and when the input device receives an input operation for order interchange of the currently read image from the user in a situation in which the processor determines that the orientation of the currently read image matches with that of the previously read image, the processor interchanges an order of the currently read image with that of a subsequently read image read by the reading section and stores the interchanged orders to the storage device.

2. The document reading device according to claim 1, wherein the processor sets a preset orientation as an orientation of a read image of a first page of the spread document.

3. The document reading device according to claim 2, wherein the processor detects whether or not the read image of the first page of the spread document is an image of a blank sheet, and when the processor detects that the read image of the first page of the spread document is an image of a blank sheet, the processor sets the preset orientation as an orientation of the read image of the first page of the spread document.

4. The document reading device according to claim 1, wherein the processor sets the orientation of the currently read image read by the reading section based on the orientation of the previously read image.

5. The document reading device according to claim 4, wherein the processor detects whether or not an image of a page read by the reading section is an image of a blank sheet, and upon detecting that an image of the currently read page read by the reading section is an image of a blank sheet, the processor sets an orientation for the currently read image based on the orientation of the previously read image.

6. The document reading device according to claim 4, wherein the processor interchanges an order of the currently read image with an order of the previously read image.

7. The document reading device according to claim 4, wherein the processor deletes the currently read image from the storage device.

8. The document reading device according to claim 7, wherein the processor deletes the previously read image in addition to the currently read image.

* * * * *